United States Patent
Boukhayma et al.

(10) Patent No.: US 12,481,038 B2
(45) Date of Patent: Nov. 25, 2025

(54) TIME-OF-FLIGHT DEVICE AND 3D OPTICAL DETECTOR

(71) Applicant: Ecole Polytechnique Fédérale de Lausanne (EPFL), Lausanne (CH)

(72) Inventors: Assim Boukhayma, Neuchâtel (CH); Antonino Caizzone, Milvignes (CH); Christian Enz, Saint-Aubin-Sauges (CH)

(73) Assignee: ECOLE POLYTECHNIQUE FÉDÉRALE DE LAUSANNE (EPFL), Lausanne (CH)

( * ) Notice: Subject to any disclaimer, the term of this patent is extended or adjusted under 35 U.S.C. 154(b) by 1113 days.

(21) Appl. No.: 17/419,467

(22) PCT Filed: Jan. 15, 2019

(86) PCT No.: PCT/IB2019/050316
§ 371 (c)(1),
(2) Date: Jun. 29, 2021

(87) PCT Pub. No.: WO2020/148570
PCT Pub. Date: Jul. 23, 2020

(65) Prior Publication Data
US 2022/0120873 A1 Apr. 21, 2022

(51) Int. Cl.
*G01S 7/48* (2006.01)
*G01S 7/4863* (2020.01)
(Continued)

(52) U.S. Cl.
CPC .......... *G01S 7/4863* (2013.01); *G01S 7/4865* (2013.01); *G01S 7/4876* (2013.01); *G01S 17/18* (2020.01)

(58) Field of Classification Search
None
See application file for complete search history.

(56) References Cited

U.S. PATENT DOCUMENTS 8,633,431 B2 1/2014 Kim
2004/0233416 A1 11/2004 Doemens et al.
(Continued)

FOREIGN PATENT DOCUMENTS

JP 2010-035168 A 2/2010
WO WO 2019/016191 1/2019

OTHER PUBLICATIONS

International Search Report and Written Opinion of the International Searching Authority, mailed on Sep. 10, 2019, from International Application No. PCT/IB2019/050316, filed on Jan. 15, 2019. 13 pages.
(Continued)

*Primary Examiner* — Hovhannes Baghdasaryan
(74) *Attorney, Agent, or Firm* — HoustonHogle LLP

(57) ABSTRACT

A Time-of-flight optical device and a 3D optical detector comprising a CMOS integrated circuit with an array of photosensitive pixels that are, at least in part, interconnected to form macro-pixels (180). Each macro-pixel (180) groups a plurality of individual pixels contributing their photocarriers to a common sense node SN through a plurality of transistors in parallel. Preferably the integrated circuit includes switched capacitor circuits arranged to combine the potential of the sense nodes SN of a plurality of macro-pixels, and/or to perform correlated double samplings in an energy efficient way. Each pixel has now an additional sink gate (194) between the pinned photodetector, PPD, potential well and a positive voltage source. By this additional sink gate (194), the storage well of the PPDs can be emptied without transferring the charge to the sense node. The value of the transfer gate voltage V_TG may be adapted such that the potential barrier is not lowered all the way down, but decreased to a value $V_B<V_P$. In this manner, the potential well of the PPDs is emptied only in part. This amounts to subtracting a constant value from $V_{TRAN}$ and can be used to (Continued)

zero a background illumination value. Importantly, the charge left in the potential well is discharged by the sink transistor (194) before the next integration and does not affect successive cycles.

18 Claims, 4 Drawing Sheets

(51) Int. Cl.
    *G01S 7/4865*     (2020.01)
    *G01S 7/487*     (2006.01)
    *G01S 17/18*     (2020.01)

(56) References Cited

U.S. PATENT DOCUMENTS

2010/0020209 A1\*   1/2010   Kim ..................... H04N 25/705
                                                348/E5.022
2012/0175685 A1     7/2012   Kim et al.
2017/0332029 A1    11/2017   Feick

OTHER PUBLICATIONS

International Preliminary Report on Patentability mailed on Jul. 29, 2021, from International Application No. PCT/IB2019/050316, filed on Jan. 15, 2019. 10 pages.

\* cited by examiner

TIME-OF-FLIGHT DEVICE AND 3D OPTICAL DETECTOR

RELATED APPLICATIONS

This application is a § 371 National Phase Application of International Application No. PCT/IB2019/050316, filed on Jan. 19, 2019, now International Publication No. WO 2020/148570 A1, published on Jul. 23, 2020, which is incorporated herein by reference in its entirety.

FIELD OF THE INVENTION

The present invention concerns, in embodiments, an optical detector comprising an array of light-sensitive devices, and a processing electronic device that operates with such a detector and a modulated light source to measure the time of flight of the light to an arbitrary reflector.

An application of the present invention is an optical rangefinder that, by measuring said time of flight, determines the distance to the reflector, as well as the methods of operating and controlling the detector and processing the relative signals. The present invention can be advantageously used in photo and video cameras, smartphones, 3D scanners, biometric identification devices, automotive applications and other fields.

DESCRIPTION OF RELATED ART

Recent years have brought a surge of interest in 3D vision systems and optical rangefinders, driven mainly by requirements from mobile applications, gaming, and automotive. Among these, the time-of-flight (TOF) technique relies on the measurement of a time delay between the emission of a light pulse and the reception of the light backscattered from one or several objects.

Laser rangefinders and LIDARS, using a laser beam to determine the distance to an object, are known and widely employed in surveying, military, 3D scanning and other applications. Such devices require fast and sensitive photodetectors and are often equipped to this purpose with solid-state avalanche photodiodes (APD) and single-photon avalanche diodes (SPAD). Vacuum photomultipliers and multichannel plates are also used.

Other proposed TOF devices detect the backscattered light by conventional solid-state photodetector, both single-channel or of the imaging variety. In the latter case, if the distance is determined for several pixels of a frame, the result is a 3D vision system.

Solid-state image CMOS sensors are used widely in cell-phones, cameras and scientific imaging devices. In these devices, the conversion of light into an electric signal is performed by an array of pinned photodetectors (PPD, not to be confused with PIN diodes), each PPD has a buried potential well region into which the photoelectron generated by impinging light can be integrated for a desired time, and a transfer gate that can be opened to transfer the integrated charge into a sense node. CMOS image sensor typically include some form of amplification in each pixel, often a source-follower transistor.

The use of CMOS image sensors for TOF distance sensors and 3D cameras has been proposed. This use case usually requires large pixels to accumulate a significant number of photo-electrons, but a large pixel size implies a slower transfer of charge to the sense node, and consequently a worse distance resolution. Systems averaging the output of multiple pixels have been considered but, they come with design complexity, slow readout and more power consumption.

BRIEF SUMMARY OF THE INVENTION

An aim of the present invention is the provision of an improved photosensitive device with an array of pinned photodiodes that overcomes the limitation mentioned above. According to the invention, these aims are achieved by means of the object of the appended claims, and in particular by a time-of-flight optical device for the contactless determination of the distance to a target comprising: a source generating a modulated beam of light impinging on a target; an optical detector receiving light backscattered from the target; a logic circuit, arranged to determine the distance of the target from the time structure of the backscattered light received by the optical detector, wherein the optical detector comprises an integrated circuit with an array of photosensitive pixels in which at least a subset of the pixels are interconnected to form a macro-pixel, the pixels in the macro-pixel sharing a common sense node.

The dependent claim relate to optional advantageous aspects including: the pixels in the macro-pixel having each a potential well, a first transistor between the potential well and the common sense node, the gates of the first transistors in a macro-pixel being connected in parallel or operated simultaneously; as well as the inclusion of a second transistor between the potential well and a sink node held at a given potential, and connecting in parallel or operating simultaneously the gates of the second transistors in a macro-pixel, or the inclusion of a reset transistor for forcing the sense node to a determined potential, and an amplifier whose input is connected to the sense node; switched capacitor circuits arranged to perform a correlated double sampling of the potential of the sense node of a macro-pixel and/or to combine the potential of the sense nodes of a plurality of macro-pixels; a 3D optical detector comprising the time-of-flight optical device of any one of the preceding claims.

An independent aspect of the invention relates to a method for determining the distance of a target comprising: generating a modulated beam comprising pulses of light impinging on the target; receiving light backscattered from the target; integrating the received light signal in multiple periodic windows, synchronised with the transmitted signal 80; determining a time shift between the generated light and the received signal based on the integrated light signals. Optionally, this method includes the computation of a first value that represents the intensity of the received pulses, and second value that integrates only part of the pulsed that are received after the end of the transmitted pulses by a determined interval and a measure of a background illumination.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
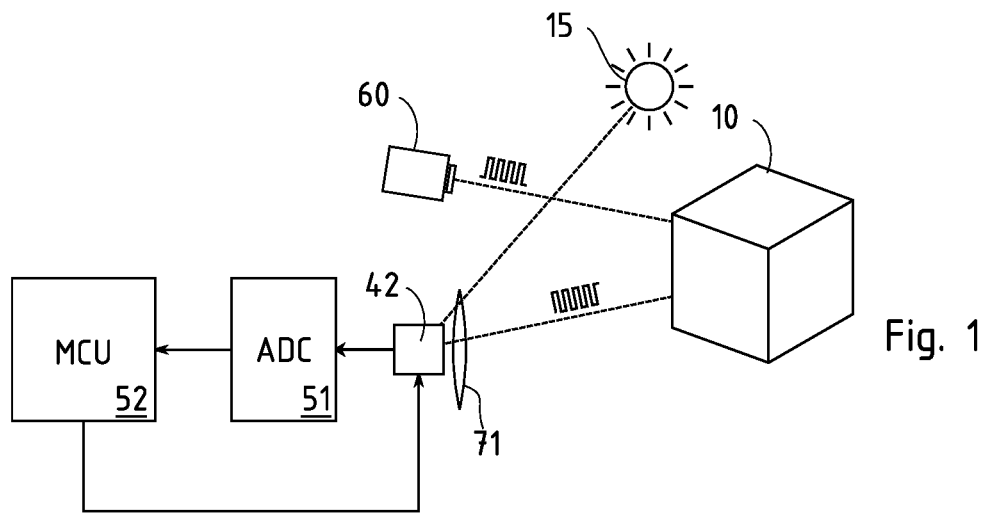
FIG. 1 shows, in a simplified schematic form, an indirect time-of-flight device in which a light source sends a modulated luminous radiation to a target, and the backscattered light is detected by a sensor and processed to determine the distance to the target or, if the detector has imaging capability, a 3D image.

FIG. 1 illustrates, in a simplified schematic fashion, a device according to an aspect of the invention. The device has a modulated optical source 60 that could be a suitably driven solid-state LED, a solid-state laser, for example a VCSEL laser, or any other optical source. The light generated by the source 60 impinges on the target 10. Part of the light scattered by the target is directed back to the device of the invention, where it is detected by the optical detector 42.

The wavelength of the radiation emitted by the source 60 is not essential, and the invention could use infrared or ultraviolet illumination, by choosing a photodetector 42 having the appropriate spectral response. In a favoured implementation, however, the invention uses radiation in the visible, near-infrared or mid-infrared regions of the electromagnetic spectrum.

The time of flight is determined indirectly from the temporal shift between the signal modulated on the transmitted light and that detected in the backscattered signal. In a possible implementation, the light emitted by the source 60 consists of a succession of equidistant rectangular pulses of light, separated by intervals of darkness, but this is not the only choice possible and in fact the modulation of the source 60 can also vary within large boundaries including for example: sinusoidal modulation, pulses of variable duration or rate, chirps, pseudorandom sequences, and many other signals.

The determination of the time shift, and therefore of the distance to the target is carried out by a suitable logical processing circuit receiving the signal available at the output of the photodetector 42. Here the logic circuit is represented for simplicity by an ADC 51 and a microcontroller 52, but that could include any suitable component. The logic circuit may also involve linear or nonlinear analogue parts, for example amplifiers or analogue adders, and may be realized fully or in part in the same integrated circuit as the optical detector 42.

The device of the invention is designed to operate in normal everyday environments with a background illumination from any number of artificial or natural light sources 15. The determination of the temporal shift is done in a way that the presence of these sources does not affect the validity of the result, as it will be explained later. Often, the effect of the ambient light can be corrected or compensated in processing, since the ambient light can be considered constant. In alternative, the detector 42 could include a spectral filter to select precisely a wavelength of light emitted by the source 60.

Preferably, a light collection device is used to increase the intensity of the received light on the detector 42. In possible variants, the light collection device 71 may be an imaging objective, and the detector 41 an image-sensing array. Such an embodiment may be a 3D optical detector capable of determining the distance of several point on an image of the target.

Figure 2:
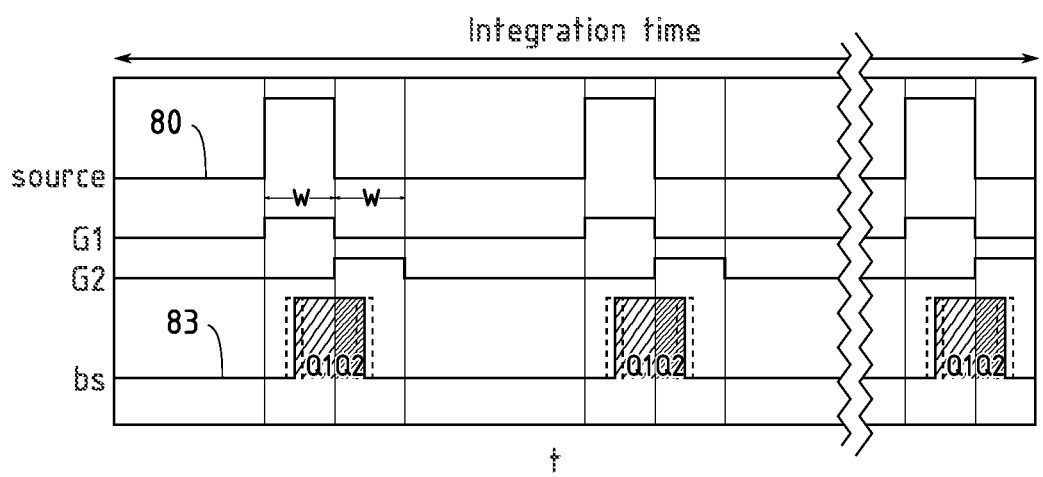
FIG. 2 is a simplified chronogram showing a possible processing of the backscattered light signal in the invention.

FIG. 2 shows an advantageous processing method that could be used in the frame of the present invention to determine the time shift between the light source and the backscattered light, and may constitute an independent invention, when applied to any suitable light detector. The amplitude-modulation of the source 60 is represented by the line 80. It presents a regular succession of rectangular pulses of width w separated by equal pauses without emission. The light received by the photodetector 42 is represented by the plot 83 that shows the pulses delayed by an amount the is, on average given by $\Delta t = c \cdot d$, where c denotes the speed of light, and d the distance.

The logic circuit integrates the received signal 83 applying two successive periodic windows G1 and G2 synchronised with the source modulation 80. The integration time is determined by signal and noise considerations and yield two integrated intensity values denoted Q1 and Q2. The integration windows G1 and G2 are arranged such that the received pulses are expected to be completely contained in the union of the two windows G1∪G2, while the delayed windows G2 contain only a part of the transmitted pulse that arrives after the trailing edge of the transmitted signal 80.

The logic circuit then computes the quantity $R = Q2/(Q1+Q2)$. R is proportional to the time shift between the signals 80 and 83 and, inherently, to the distance to the target 10. The proportionality constant can be computed a priori or easily calibrated.

It will be observed that, since the windows G1 and G2 begin and end at the same time as the trailing edge of the modulated source 80, R is linearly dependent from the distance in the range $[0, w \cdot c]$. This is not an essential feature of the invention, however: the invention may use a different timing of the windows. For example, the windows G1, G2 could be delayed, to shift the measuring range correspondingly; the maximum distance range could be changed by lengthening or shortening the width w, or by adding further delayed gate signals; the integration time can be lengthened to improve the S/N ratio or shortened to increase the bandwidth. Preferably, the logic circuit of the invention can adapt these and other parameters according to the needs, under the control of an internal adaptive procedure, or following external commands.

Figure 3:
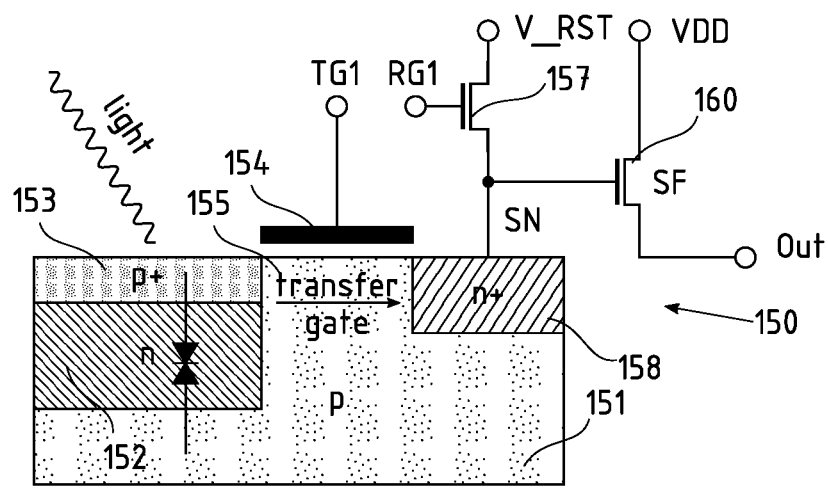
FIGS. 3 and 4 illustrates schematically a structure of a PPD photosensitive pixel applicable to the present invention, in cross-section, respectively from above.
Figure 4:
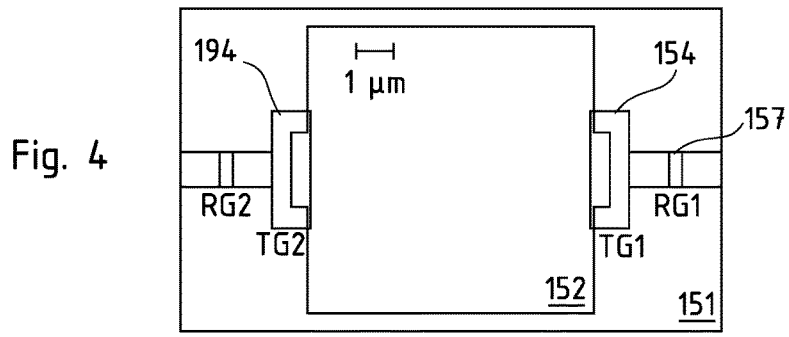

The device of the invention adopts an array with a plurality of photodetector sites or pixels, preferably each site includes a pinned photodiodes (PPD) as photodetectors, the main elements whereof are represented schematically in FIGS. 3 and 4, in a possible CMOS implementation.

Figures 5A, 5B, 5C, 5D:
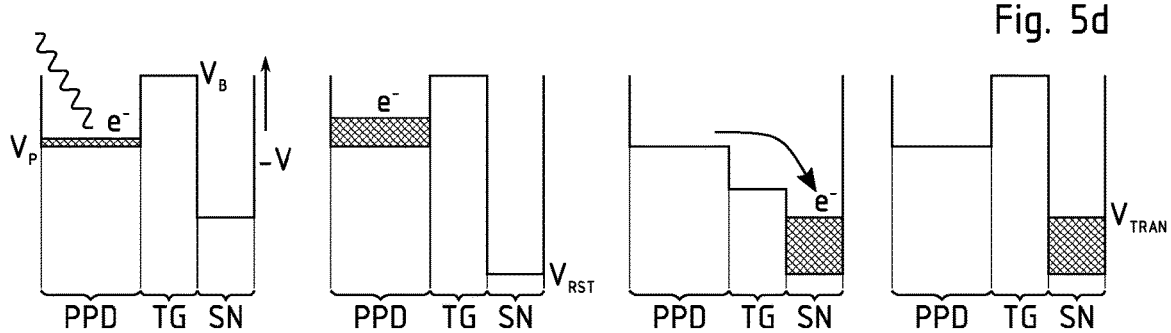
FIGS. 5a to 5d illustrate the different potentials and corresponding transfer of carriers in a PPD pixel as that represented in FIG. 3 and in successive phases of operation.

Each pixel includes an n-type buried potential well region 152 sandwiched within the lower p layer 151 (that may be tied to the reference potential) and the p+ pinning layer 153. In the depleted state, without any photon-induced carrier, the potential in the well region 152 assumes spontaneously a positive value $V_p$ called the pinning potential, as shown in FIG. 5a. The transfer gate region 155 is a potential barrier whose height can be controlled by the potential V_TG on the gate of the transfer gate transistor 154, and the sense node region 158 is a n+ region that can be charged at a predetermined value $V_{RST}$ by the transistor 157 and read by source follower 160. In this and the following figures the p+-n-p structure of the PPD has been indicated with a symbol containing two conventional junction diodes nose-to-nose, but in the literature such structures are indicated in various ways.

Importantly, and differently form photodiodes and other photodetectors, PPD do not generate a photocurrent proportional to the incident light intensity because, in normal conditions, the photoelectrons collect in the potential well of the n region 152. photoelectrons are stored in the collecting region 152 until the barrier under the transfer gate is lowered by applying a sufficient potential to the gate electrode of the transfer gate transistor 154. PPD are inherently integrating devices. Another advantage of the PPD lies in their very low dark currents and shot noise, and excellent performances at low illumination levels.

FIGS. 5a to 5d illustrate a sequence of operations implied in the readout of such a pixel: FIG. 5a shows the integration phase. The cycle starts with the PPD potential well in a depleted state, and the barrier VB is closed, singe the gate electrode of the transfer gate transistor 154 is at a low potential. The impinging radiation is converted in photoelectrons that accumulate in the well.

FIG. 5b shows a reset operation that may take place immediately before or during the integration of FIG. 5a: the transistor 157 momentarily in set in conduction, whereby the sense node is charged to a determined positive potential $V_{RST}$, then left floating.

At the end of the integration phase, the transfer phase shown in FIG. 5c takes place: the potential barrier is momentarily lowered by applying a suitable high potential to the transfer gate electrode of the transfer gate transistor 154. The photoelectrons migrate into the sense node at lower potential.

In the readout final phase, visible in FIG. 5d, the potential barrier is raised again, and the source follower senses the value $V_{TRAN}$. The integrated charge value is $Q=(V_{TRAN}-V_{RST}) \cdot C_{SN}$, where $C_{SN}$ denotes the capacity of the sense node.

Preferably, the source follower 160 performs a correlated double sampling of the potential $V_{RST}$ of the sense node at the reset and the potential $V_{TRAN}$ after the transfer. The difference $V_{TRAN}-V_{RST}$ may be obtained numerically or, better, by a dedicated analogue circuit. Correlated double sampling not only remove the constant $V_{RST}$ value, but also reduces flicker noise.

Figure 7:
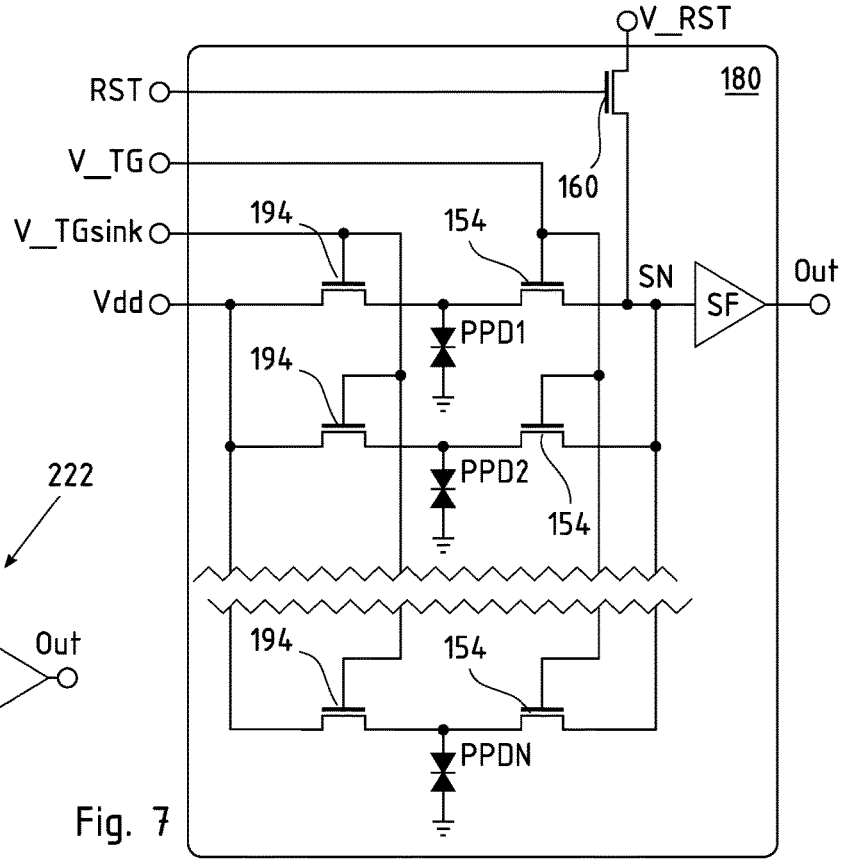
FIG. 7 shows a macro-pixel structure.

FIG. 7 shows a simplified schematics of a switched capacitor circuit 222 that may be used, in the scope of the invention, to compute the difference between two consecutive correlated samples. The circuit comprises two capacitors C1, C2 of same value that can be charged separately from the input, by closing momentarily the switches S1, respectively the switch S2, or connected in parallel with opposite polarities, by closing switches S3 and leaving open switches S1 and S2. The switches may be implemented by MOSFETs or in any other way.

In a possible sequence of operations—which is not however the only possible—the input of the double correlating sampling circuit of FIG. 7 may be connected at the output of a pixel and, while the reset switch 160 is closed, the switches S1 may be closed to copy the value $V_{RST}$ into capacitor C1. Successively, after the integration and transfer phases described above, the switch S2 is closed momentarily to copy the value $C_{TRAN}$ into capacitor C2. By opening S1, S2, and closing S3, the capacitors C1, C2 are connected in parallel but the polarity of C1 is reversed: The output of this stage is $(V_{TRAN}-VRST)/2$.

Advantageously, the double correlated sampling stage 222 can perform the subtraction of the $V_{RST}$ value in a fast and precise way, with a negligible power consumption, which is of paramount importance in portable and wearable applications. The device of the invention may include several such stages to subtract the reset voltage of the pixels, $V_{RST}$, as illustrated above, or to subtract a background illumination value, or other values as required by data processing. It lends itself to several modifications that may be useful on various situations, for example the values of the capacitors could be chosen to perform a weighted subtraction, and the gain of the output buffer could be different from unity.

FIG. 7 represents a structure of a part of a photodetector device that is used in a preferred embodiment of the present invention. With respect to the pixel of FIG. 4, each pixel has now an additional sink gate 194 between the PPD potential well and a positive voltage source. By this additional sink gate, the storage well of the PPD can be emptied without transferring the charge to the sense node. This may be used to implement an electronic global shutter, for example.

Another improvement of the device of FIG. 7 is that a plurality of PPD are interconnected to form a "macro-pixel" 180. Each cell of the macro pixel has a PPD and two transfer gates, but they all share a same sense node SN and have a source follower and reset transistor 160 in common. The individual pixels in a macro pixel are arranged with the control electrodes of all the sink gates interconnected, and all the control electrodes of the transfer gates interconnected, such that the emptying of the storage wells, integration, and transfer phases are simultaneous in all the pixel of the macro-pixel. This is different from architectures that transfer charge from several pixels to a shared sense node in a rolling fashion.

A macro-pixel may correspond to a spatially compact cluster of pixels, to row/column of an array, or to any arrangement of pixels in the array, no matter how they are arranged on the surface, electrically connected as shown.

The macro-pixel disposition of FIG. 7 is advantageous because, the photoelectrons from several individual PPD are transferred to a shared sense node and the macro-pixel behaves like a single photodetector with a large area, but with the inherent low-noise capabilities of PPDs. Since the pixels are operated synchronously, the integration window can be precisely determined in time.

Importantly, the speed of the macro-pixel is determined by the diffusion time of the photocarrier in the individual pixels. By combining the individual pixels in a macro-pixel in the disclosed manner, the device of the invention multiplies the light collection without worsening the response time of the photodetectors. This is particularly desirable and advantageous for an optical time-of-flight detector.

Figure 5E:
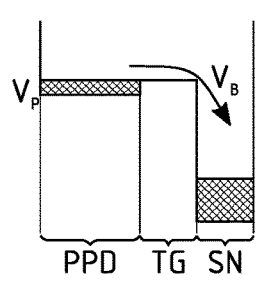
FIG. 5e is a variant of FIG. 5c.

An interesting variant to the operative cycle of FIGS. 5a-5d, shown in FIG. 5e, consists in adapting the value of the transfer gate voltage V_TG such that the potential barrier is not lowered all the way down, but decreased to a value $V_B<V_P$. In this manner, the potential well of the PPD is emptied only in part. This amounts to subtracting a constant value form $V_{TRAN}$ and can be used to zero a background illumination value, for example. Importantly, the charge left in the potential well is discharged by the sink transistor 194 before the next integration and does not affect successive cycles.

Figure 8:
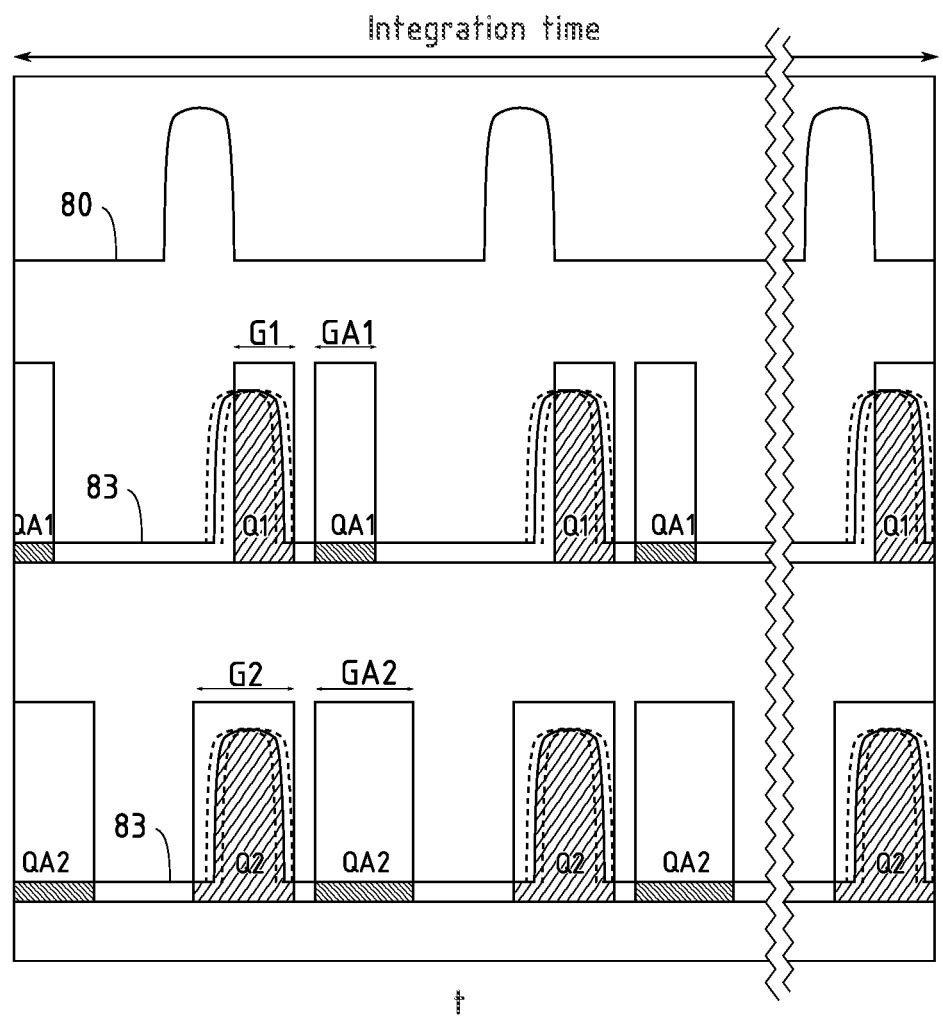
FIG. 8 shows an alternative processing including a subtraction of ambient light.

FIG. 8 illustrates another that is a variant of the processing method described above in relation to FIG. 2. The integration gates G1 and G2 are arranged such that the received pulses are expected to be completely contained in the second gate G2, which is broader, while delayed gates G1 contain only a part of the transmitted pulse that arrives after the trailing edge of the transmitted signal 80. The signal is not integrated only during the intervals G1, G2, but also in delayed intervals of same length, indicated as GA1 and GA2, that are sufficiently delayed that they will not record any pulse form the source, but only ambient light.

In this variant, the received signal 82 is integrated in four windows Q1, QA1, Q2, QA2 and provides 4 values Q1, QA1, Q2 and QA2. The values QA1 and QA2 represent the ambient illumination and is subtracted from Q1, respectively Q2 to retain only the signal from the source 80. The value Q2-QA2 can be used to normalize the measurement and make it independent from laser power and reflectance of the target. Accordingly, the logic circuit evaluates the distance from the quantity R'=(Q1−QA1)/(Q2+QA2) that is proportional to the time shift between the signals 80 and 83 and, inherently, to the distance to the target 10. The proportionality constant can be computed a priori or easily calibrated.

As in the previous example, since the gate signals G1 begins and at the same time as the trailing edge of the modulated source 80, R is linearly dependent from the distance in the range [0, w·c]. Again, this is not essential, and the windows could be timed differently to select another measuring range.

The invention preferably uses a processing algorithm like those described, in which the received signal 83 is integrated in multiple periodic windows synchronised with the transmitted signal 80. The windows are chosen such that they allow to compute a normalization value that integrates the full pulse and can be used to factor in the intensity and the reflectance of the target, and a second value that integrates only part of the pulsed that are received after the end of the transmitted pulses by a determined interval. This manner of computing the distance is particularly adapted for mobile device that have limited hardware resources.

Figure 9:
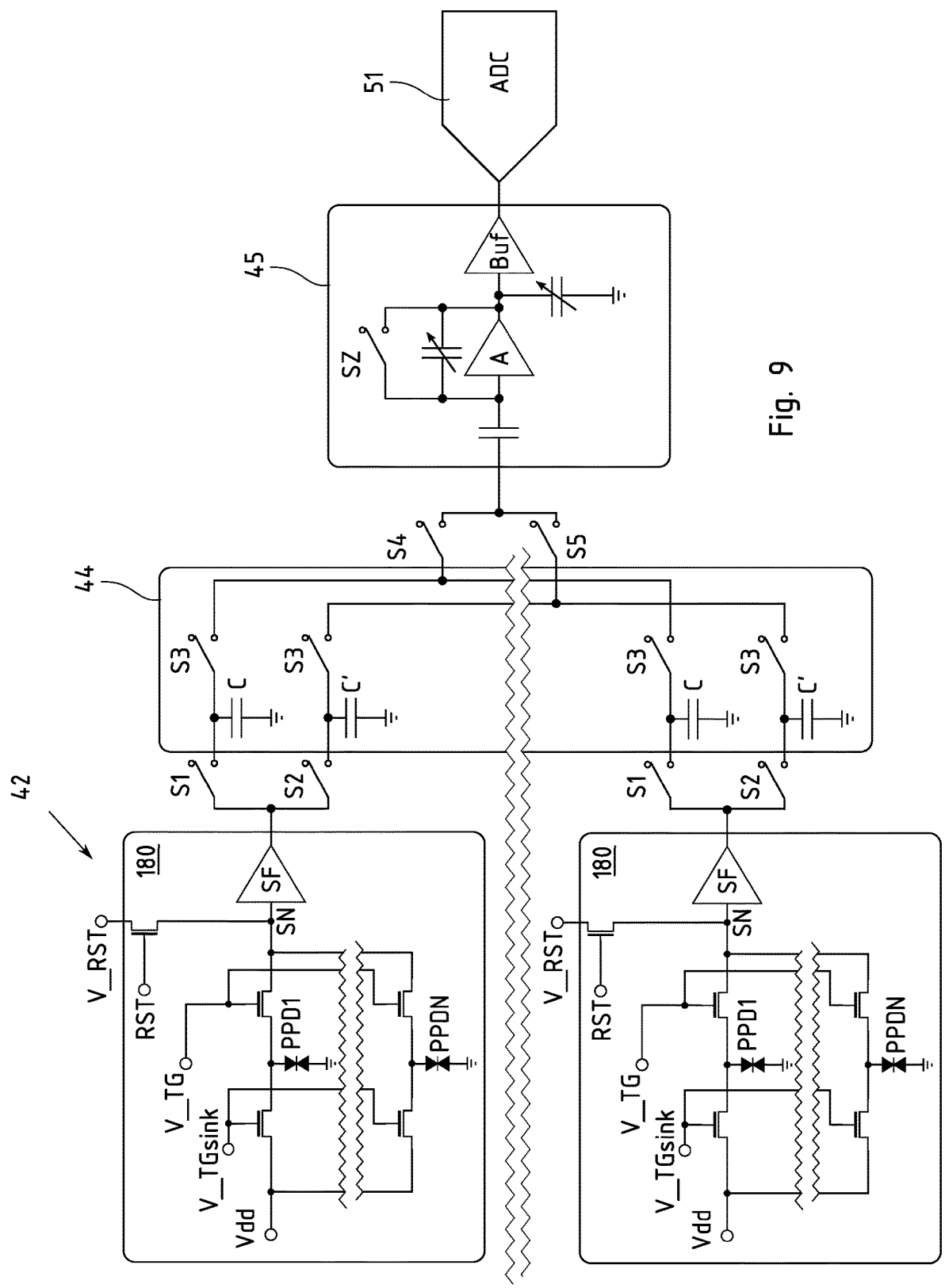
FIG. 9 is one possible arrangement of an electronic circuit designed to process the signal issuing from a plurality of macro-pixels.

FIG. 9 shows a possible implementation of a PPD photodetector suitable for the realization of the invention. The figure shows also part of the associated readout and digitization electronics, and these sub-circuits may be incorporated totally or in part in the same chip as the photodetectors.

The detector of FIG. 9 comprises a plurality of PPD pixel organized in macro-pixels as shown in FIG. 7. Each macro-pixel may correspond to a group of pixels in the array in a geometrically compact configuration, for example in the case of a 3D camera; or be spread across the whole array if one seeks to determine an average distance in a simple way. Each macro-pixel could include up to hundreds or thousands of individual pixels. The macro-pixels may be surrounded by ordinary imaging pixels, or cover the whole photosensitive surface of the array, which may include 100 000 or more individual pixels, according to the use case.

The macro-pixels are connected to an averaging stage 44 that collects the charges from each macro-pixel and averages them. The first sample of each pixel is stored in capacitors C by opening switches S2 and S3 and closing switches S1. Then switches S1 are opened, switches S2 are closed, and the second sample is stored in capacitors C'. The averaging of these samples is performed by closing the switches S3, whereby all the capacitors C, respectively C' are connected in parallel and become, in effect two larger capacitors storing the whole charge of the respective samples. This process allows averaging and multiple sampling at negligible power consumption.

The charge stored in capacitors C is transferred to the sample-and-hold stage 45 by closing momentarily the switch S4 and digitized by the ADC 51. Then, the sample-and-hold is reset by SZ, and the switch S % is closed to sample and digitize the charge stored in capacitors C'.

It is noted that the circuit of the invention reads all the pixels in the macro-pixels (of the whole array) simultaneously, with consistent timing, and delivers an average illumination value, in contrast with conventional image sensors where the individual pixels are read separately in rolling fashion.

Figure 6:
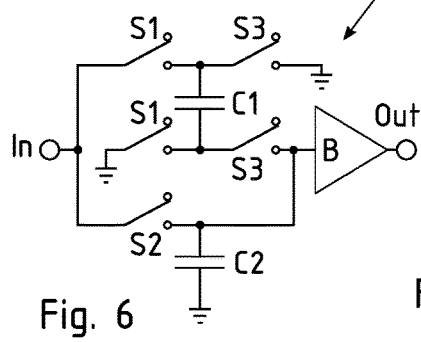
FIG. 6 is a simplified schematics of a low-power double correlated sampling stage.

The circuit of FIG. 9 may include double correlated sampling stages as described above in relation to FIG. 6, or functionally equivalent stages, to implement certain subtraction of pedestal values, like a reset voltage $V_{RST}$ or a background illumination value in hardware. This may allow a reduction of the rate of the ADC 51 and, since the power consumption of the double sampling stage of FIG. 6 is very low, leads to a better battery life in portable devices.

REFERENCE SYMBOLS 10 target
15 ambient light source
42 optical detector
44 averager
45 sample-and-hold
51 ADC
52 logic circuit, microcontroller
60 light source, laser
71 objective lens
80 source intensity
83 backscattered light intensity
151 lower layer
152 storage well
153 pinning layer
154 transfer gate electrode
155 transfer channel
157 reset transistor
SN sense node
160 source follower
SF source follower, amplifier
180 macro-pixel
194 sink transistor
222 double correlated sampling stage

The invention claimed is:

1. A Time-of-flight optical device for the contactless determination of the distance to a target comprising:
    a source generating a modulated beam of light impinging on a target;
    an optical detector receiving light backscattered from the target; and
    a logic circuit, arranged to determine the distance of the target from the time structure of the backscattered light received by the optical detector;
    wherein the optical detector comprises an integrated circuit with an array of photosensitive pixels in which at least a subset of the pixels are interconnected to form a macro-pixel, the pixels in the macro-pixel sharing a common sense node, and wherein the pixels in the macro-pixel have each a potential well for collecting photocarriers, a first transistor between the potential well and the common sense node of the macro-pixel, and wherein the gates of the first transistors in a macro-pixel are connected in parallel for transferring photocarriers stored into the potential wells of the macro-pixel to the common sense node at the same time.

2. The time-of-flight optical device of claim 1, wherein the pixels in the macro-pixel comprise each a second transistor between the potential well and a positive voltage source held at a given potential, and wherein the gates of the second transistors in a macro-pixel are connected in parallel or operated simultaneously for emptying the potential wells of the pixels in the macro-pixel at the same time.

3. The time-of-flight optical device of claim 1, wherein the macro-pixel includes a reset transistor for forcing the sense node to a determined potential, and an amplifier whose input is connected to the sense node.

4. The time-of-flight optical device of claim 1, wherein the integrated circuit is a CMOS integrated circuit and comprises one or more switched capacitor circuits arranged to perform a correlated double sampling of the potential of the sense node of a macro-pixel.

5. The time-of-flight optical device of claim 1, wherein the integrated circuit is a CMOS integrated circuit and comprises one or more switched capacitor circuits arranged to combine the potential of the sense nodes of a plurality of macro-pixels.

6. The time-of-flight optical device of claim 1, wherein the logic circuit is arranged to integrate a received signal of the backscattered light in multiple periodic windows, synchronised with the modulated beam.

7. The time-of-flight optical device of claim 6, wherein the logic circuit computes a first value that represents the intensity of received pulses, and second value that integrates only part of the pulses that are received after the end of transmitted pulses by a determined interval.

8. The time-of-flight optical device of claim 6, wherein the logic circuit is arranged to integrate the received signal in windows where no signal from the source is expected, to evaluate a background illumination value.

9. A 3D optical detector comprising the time-of-flight optical device of claim 1, an imaging optics system arranged to project an image of the target on the array and comprising a plurality of macro-pixels for determining the distance of a corresponding plurality of points on the target.

10. A method for determining the distance of a target comprising:
generating a modulated beam comprising pulses of light impinging on the target;
receiving light backscattered from the target with an optical detector comprising an integrated circuit with an array of photosensitive pixels in which at least a subset of the pixels are interconnected to form a macro-pixel, the pixels in the macro-pixel sharing a common sense node, and wherein the pixels in the macro-pixel have each a potential well for collecting photocarriers, a first transistor between the potential well and the common sense node of the macro-pixel, and wherein the gates of the first transistors in a macro-pixel are connected in parallel for transferring photocarriers stored into the potential wells of the macro-pixel to the common sense node at the same time;
integrating the received light signal in multiple periodic windows, synchronised with the transmitted signal;
determining a time shift between the generated light and the received signal based on the integrated light signals.

11. The method of claim 10, comprising:
computing a first value that represents the intensity of received pulses corresponding to the received backscattered light, and second value that integrates only part of the received pulses that are received after the end of the transmitted pulses by a determined interval;
determining a time shift between the generated light and the received signal based on said first and second value.

12. The method of claim 10, comprising measuring a background illumination by integrating the received light signal in windows where no light from the source is expected.

13. The time-of-flight optical device of claim 4, wherein the correlated double sampling comprises computing a difference between two consecutive correlated samples.

14. The time-of-flight optical device of claim 4, wherein the one or more switched capacitor circuits are configured to perform correlated double sampling by storing a first potential of the common sense node during a reset phase and a second potential of the common sense node after the transferring of the photocarriers stored in the potential wells of the macro-pixel to the common sense node, and wherein the integrated circuit computes a difference between the stored first potential and the stored second potential.

15. The time-of-flight optical device of claim 14, wherein the switched capacitor circuit comprises a first capacitor configured to store the first potential and a second capacitor configured to store the second potential, and wherein the first and second capacitors are connected in parallel with an input corresponding to an output of the macro-pixel and with an output corresponding to the difference between the stored first potential and the stored second potential.

16. The time-of-flight optical device of claim 4, wherein the switched capacitor circuit is further configured to subtract a background illumination signal by storing an integrated background signal in a capacitor during a time interval when no signal from the modulated light source is expected and subtracting this stored signal from the detected backscattered light signal.

17. The time-of-flight optical device of claim 5, wherein the one or more switched capacitor circuits are configured to combine the potentials of sense nodes of a plurality of macro-pixels, such that the integrated circuit averages the charge signals from the plurality of macro-pixels before readout.

18. The time-of-flight optical device of claim 17, wherein the integrated circuit reads all of the plurality of macro-pixels simultaneously and delivers an average illumination value.

* * * * *